United States Patent
Magisson et al.

(10) Patent No.: US 9,788,486 B2
(45) Date of Patent: Oct. 17, 2017

(54) GRAIN HEADER WITH SWATHING AND CHOPPING CAPABILITY

(71) Applicant: AGCO Corporation, Hesston, KS (US)

(72) Inventors: Emmanuel Magisson, Breganze (IT); Frederic Ducroquet, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/983,783

(22) Filed: Dec. 30, 2015

(65) Prior Publication Data

US 2016/0183462 A1    Jun. 30, 2016

Related U.S. Application Data

(60) Provisional application No. 62/097,665, filed on Dec. 30, 2014.

(51) Int. Cl.
*A01D 34/835* (2006.01)
*A01D 41/14* (2006.01)
*A01D 47/00* (2006.01)

(52) U.S. Cl.
CPC ............. *A01D 41/14* (2013.01); *A01D 47/00* (2013.01)

(58) Field of Classification Search
CPC .... A01D 41/14; A01D 47/00; A01D 34/8355; A01D 41/06; A01D 43/086
See application file for complete search history.

(56) References Cited

U.S. PATENT DOCUMENTS

| | | | | |
|---|---|---|---|---|
| 2,316,475 A | * | 4/1943 | Casper | A01D 57/20 56/181 |
| 2,401,513 A | * | 6/1946 | Schmidt | A01D 47/00 56/238 |
| 3,399,517 A | * | 9/1968 | Magee | A01D 45/021 56/13.9 |
| 3,508,387 A | * | 4/1970 | Wright | A01D 41/14 56/95 |
| 3,596,448 A | * | 8/1971 | Van Buskirk | A01D 57/00 56/63 |
| 3,984,966 A | * | 10/1976 | Outtier | A01D 45/021 56/10.2 R |

(Continued)

FOREIGN PATENT DOCUMENTS

| | | | | |
|---|---|---|---|---|
| AU | 1993042144 A | | 1/1994 | |
| CN | 201726680 U | * | 2/2011 | ............. A01D 45/02 |

(Continued)

OTHER PUBLICATIONS

Intellectual Property Office; International Search Report for related UK Patent Application No. GB1500825.3, dated Jul. 9, 2015.

*Primary Examiner* — Arpad Fabian-Kovacs

(57) ABSTRACT

A grain header has a frame with a cutter bar affixed to the frame. A sub-frame is pivotably coupled to the frame and a mower cutter bar is coupled to the sub-frame. A swather is coupled to the sub-frame and arranged rearward relative to the mower cutter bar. A deflector is disposed between the cutter bar and the mower cutter bar. The deflector is moveable between a raised position in which the deflector permits crop material cut by the mower cutter bar to pass onto the swather, and a lowered position in which the deflector inhibits crop material cut by the mower cutter bar from passing onto the swather.

14 Claims, 13 Drawing Sheets

(56) References Cited

U.S. PATENT DOCUMENTS

| | | | | |
|---|---|---|---|---|
| 4,715,174 | A | * 12/1987 | Lloyd | A01D 41/06 |
| | | | | 56/189 |
| 5,433,065 | A | * 7/1995 | Mosby | A01D 41/14 |
| | | | | 56/13.9 |
| 5,463,857 | A | * 11/1995 | Blosser | A01D 47/00 |
| | | | | 56/238 |
| 5,904,032 | A | * 5/1999 | Rippel | A01D 41/04 |
| | | | | 460/119 |
| 9,554,510 | B2 | * 1/2017 | Nurnberg | A01D 34/8355 |
| 2004/0006958 | A1 | * 1/2004 | Thiemann | A01D 41/141 |
| | | | | 56/10.2 R |
| 2007/0209347 | A1 | 9/2007 | Malmros et al. | |
| 2014/0165527 | A1 | 6/2014 | Oehler et al. | |
| 2014/0311115 | A1 | 10/2014 | Verhaeghe et al. | |

FOREIGN PATENT DOCUMENTS

| | | | |
|---|---|---|---|
| DE | 102005025319 A1 | 12/2006 | |
| EP | 0212185 A1 | 3/1987 | |
| FR | 2794608 A1 | 12/2000 | |
| SU | 688153 A * | 9/1979 | ............ A01D 45/20 |
| SU | 973064 A * | 11/1982 | ............ A01D 45/02 |
| WO | WO 9853660 A1 * | 12/1998 | ............ A01D 41/14 |
| WO | 2013011140 A1 | 1/2013 | |
| WO | 2015004165 A2 | 1/2015 | |

* cited by examiner

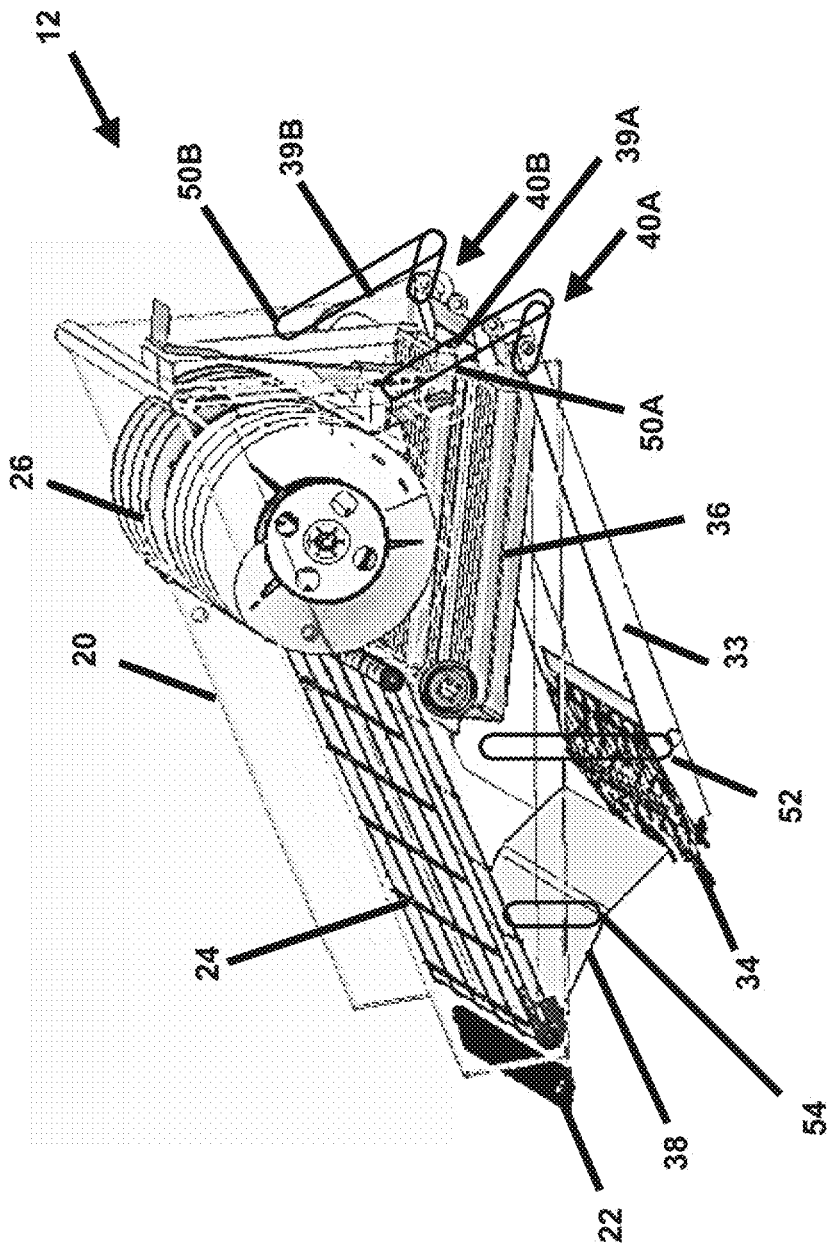

GRAIN HEADER WITH SWATHING AND CHOPPING CAPABILITY

CROSS REFERENCE TO RELATED APPLICATION

This application claims the benefit of U.S. Provisional Application No. 62/097,665 filed Dec. 30, 2014, which is hereby incorporated by reference in its entirety.

BACKGROUND

Field of Invention

The present disclosure is generally related to agricultural equipment and, more particularly, combine harvester headers.

Description of Related Art

A combine harvester is provided with many systems that provide a multitude of functionality, including threshing, separating, and cleaning of crop material (e.g., grain and material other than grain (MOG)). The threshing and separating is performed by a processing system, with further separation and cleaning performed by a shoe (e.g., chaffer and sieve assemblies). The cleaned grain is conveyed to an on-board storage bin for eventual transfer to grain trucks via an unloading tube, and the MOG is chopped and spread to the ground or to other equipment from a chopper located at the rear of the combine harvester. For some crops, such as wheat, farmers (particularly in Europe) seek to collect the grain at harvest time, and chop or swath the straw all in one pass to have the field ready for the next crop.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5A-5B are schematic diagrams that illustrate, in fragmentary side perspective views, an embodiment of an example swath or chop header used in cutting and chopping operations.

DESCRIPTION OF EXAMPLE EMBODIMENTS

Overview

Figure 1:
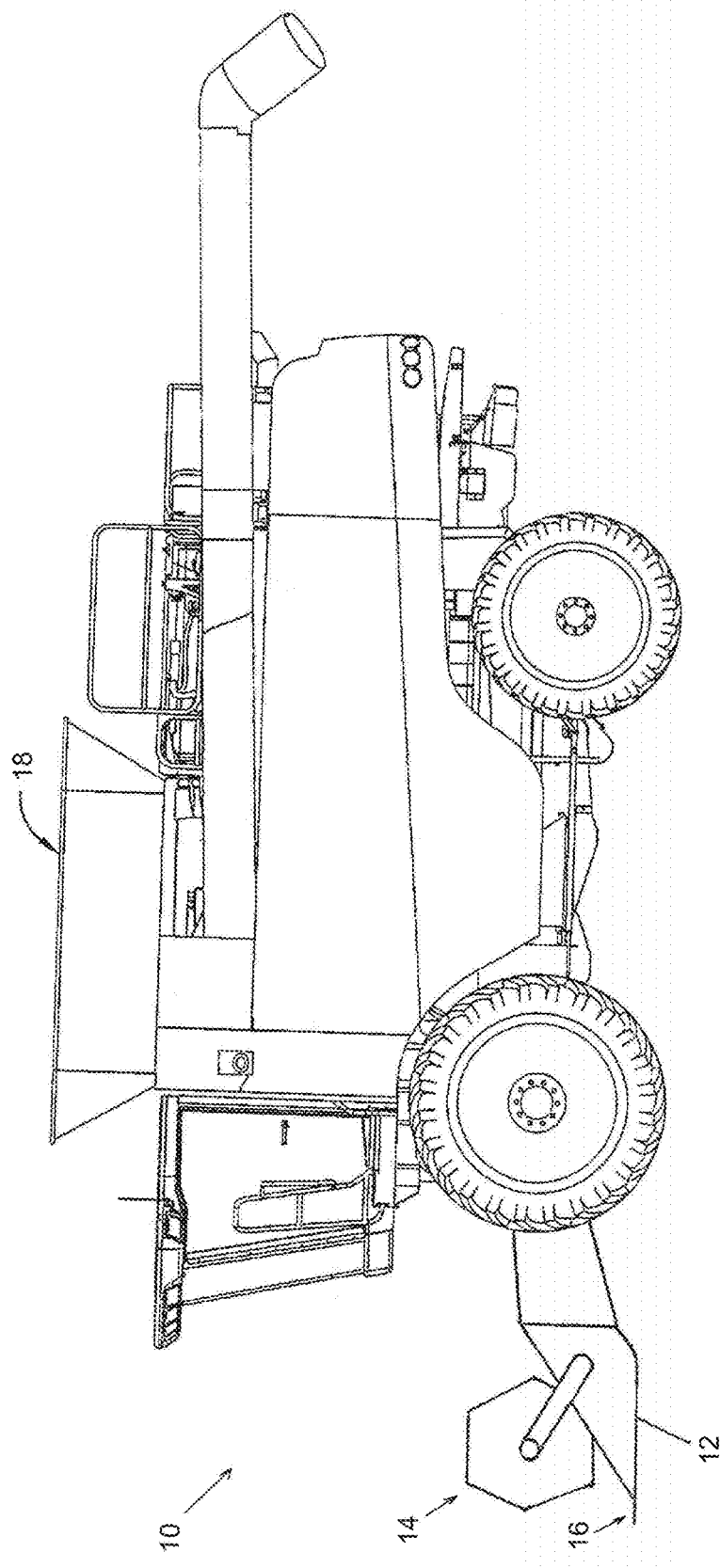
FIG. 1 is a schematic diagram that illustrates, in front perspective view, an example agricultural machine in which an embodiment of an example swath or chop header may be implemented.

In one embodiment, a method, comprising: in one pass: cutting a first portion of crop with a plurality of knives of a cutter bar of a header coupled to an agricultural machine: conveying the cut first portion to a center of the header; cutting a second portion of the crop during the same pass with a second set of knives of a mower cutter bar coupled to the header; and either chopping the cut second portion or swathing the cut second portion based on a respective position of a swather disposed rearward of the mower cutter bar and a deflector disposed between the cutter bar and the mower cutter bar.

Detailed Description

Certain embodiments of a swath or chop header and associated systems and methods are disclosed that enable both the harvesting of grain by an agricultural machine (hereinafter, a combine harvester used as an illustrative example) to which the swath or chop header is coupled as well as the swathing or chopping of material other than grain (MOG) directly under the header without bringing all of the material inside the combine harvester. In one embodiment, the swath or chop header is configured as a grain header, and comprises a frame that houses a cutter bar comprising a plurality or first set of knives (e.g., oscillating knives), a lower, mower cutter bar comprising a plurality or second set of knives (e.g., rotary disk knives), and a swather (e.g., conveyor(s)) disposed rearward of the mower cutter bar. The plane of operation of the cutter bar and the mower cutter bar may be independently adjusted based on the type and/or height of the crops in a field. The plane of operation of the swather is also independently adjustable to perform swathing when positioned approximately in-plane with the mower cutter bar and to cease swathing operations when positioned out-of-plane relative to the mower cutter bar. In some embodiments, a deflector panel (hereinafter, merely referred to as a deflector) may be retractably disposed between, and substantially spanning the width of, the cutter bar and/or the mower cutter bar. When the deflector is activated (e.g., extended between the cutter bar and the mower cutter bar), the deflector blocks or inhibits rearward flow over the mower cutter bar, causing recirculation of the cut crop material that is cut by the mower cutter bar, enabling a chopping operation to be performed. When the deflector is deactivated (e.g., retracted against the frame proximal to the cutter bar), the cut crop material may be swathed when the swather is substantially in-plane with the mower cutter bar.

Digressing briefly, conventional combine harvesters perform cutting and chopping functionality by passing the cut crop material for processing through the machine. For some harvesting operations, many combine harvesters use stripper headers to enable machine processing of primarily the heads of the cut crop plants, but such components are not as versatile as a regular cutter bar. In certain embodiments disclosed herein, the swath or chop header combines the advantages of a stripper and regular cutter bar, and adds a swathing and chopping capability. For instance, certain embodiments of a swath or chop header enable versatility in harvesting of a plurality of crops such as oil seeds, soybeans, peas, wheat, etc., and provide good chopping performance even among more difficult crops, such as oil seed (for which framers traditionally avoid lowering the header to the ground due to the risk of thresher plugging). Another added benefit for certain embodiments of swath or chop headers is enabling better rotor optimization. For instance, processing of wheat and corn become similar, with more similar grain volume/flow ratios of material passing through the combine harvester.

Having summarized certain features of a swath or chop header of the present disclosure, reference will now be made in detail to the description of the disclosure as illustrated in the drawings. While the disclosure will be described in connection with these drawings, there is no intent to limit it to the embodiment or embodiments disclosed herein. For instance, though emphasis is placed on a combine harvester with a front-coupled header, some embodiments may use other configurations of a combine harvester (e.g., not self-propelled) or other agricultural machines. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly.

Reference is made to FIG. 1, which illustrates, in front perspective view, an example agricultural machine in which an embodiment of an example swath or chop header may be implemented. The agricultural machine comprises a combine harvester 10, and is shown equipped with a coupled header that may be configured as a swath or chop header 12. One having ordinary skill in the art should appreciate in the context of the present disclosure that the example combine harvester 10 is merely illustrative, and that other machines that utilize the swath or chop header 12 may be used. Further, though illustrated in FIG. 1 as a draper-style header, other header designs may be used that incorporate the relevant features of the swath or chop header 12. The example combine harvester 10 is shown in FIG. 1 harvesting crops in a field as it traverses the field. The swath or chop header 12 couples directly or indirectly (e.g., via a lateral tilt frame) to a feeder house of the combine harvester 10 in conventional manner. The feeder house may be raised by one or more hydraulic cylinders coupled between the feeder house and a chassis of the combine harvester 10, which in turn enable the raising and lowering of the swath or chop header 12. One or more additional hydraulic cylinders in the lateral tilt frame may also be used to enable tilting (e.g., rolling, etc.) of the swath or chop header 12. In one embodiment, the swath or chop header 12 comprises adjustable reels 14 that are respectively coupled to a plurality of tine or fork bars 16 that rotate to cause crop to be forced against a cutter bar (obscured from view in FIG. 1 by the crop) as is known.

In general, and using the harvesting of tall crops as an illustrative example, the swath or chop header 12 of the combine harvester 10 cuts a first portion (e.g., primarily the heads of the plants of the crops, and a small portion beneath the heads comprising material other than grain (MOG)) of each plant of the crops, and the cut first portion is delivered (e.g., via one or more augers and optionally one or more conveyors feeding the augers) to a centralized, rear opening of the swath or chop header 12 leading to the front end of the feeder house. In the feeder house, the cut, first portion of crop materials are moved upwardly and rearwardly within until reaching a processor comprising a thresher rotor. In one embodiment, the thresher rotor may comprise a single, transverse rotor, such as that found in a Gleaner® Super Series Combine by AGCO. Other designs may be used, such as axial-based, single or twin rotor, or hybrid designs. The thresher rotor processes the crop materials in known manner and passes any non-grain portion of the crop material (e.g., heavier chaff, corn stalks, etc.) toward the rear of the combine harvester 10 and any remaining portion (e.g., grain and possibly light chaff) through a cleaning process in known manner. In general, the swath or chop header 12 minimizes the amount of MOG (especially straw) that enters the threshing unit. For some crops, such as barley (which are relatively short with the heads pointing down when ripe), almost all of the straw is ingested by the threshing unit. In the processor, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. The cleaned grain that drops to the bottom of the cleaning system is delivered by a conveying mechanism that transports the grain to a well-known elevator mechanism (not shown), which conveys the grain to a grain bin 18 located at the top of the combine harvester 10. Any remaining chaff and partially or unthreshed grain is recirculated through the processor via a tailings return conveying mechanism.

The swath or chop header 12 also comprises a mower cutter bar (not shown) that cuts another portion (most of the MOG beneath the head portion cut by the cutter bar) of each plant of the crops. As is described further below, the other portion of the crop processed by the mower cutter bar may be chopped or swathed depending on the header component adjustments, the swaths deposited on the ground via a bottom, central and rearward opening of the combine harvester 10 or in some embodiments, one or more opening located elsewhere (e.g., on plural bottom and rearward openings located on each side of a longitudinal axis of the swath or chop header 12). The chopped MOG is spread on the ground beneath the swath or chop header 12, without entering (in any significant manner) the combine harvester 10. Note that any MOG that happens to enter the combine harvester 10 also is deposited (and optionally chopped) out from the rear of the combine harvester 10 in some embodiments. As internal combine processing is known to those having ordinary skill in the art, further discussion of the same is omitted here for brevity.

Figure 2A:
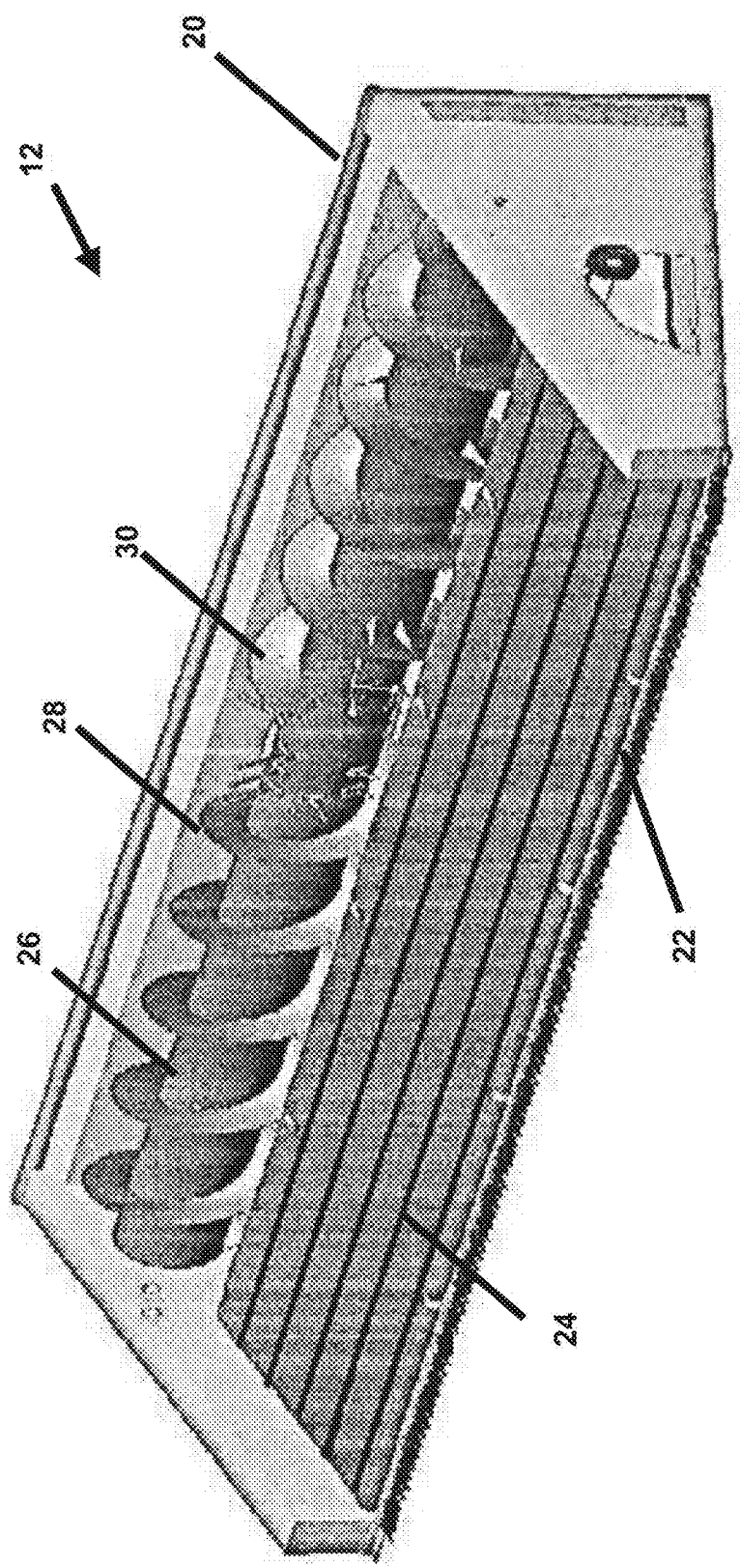
FIG. 2A is a schematic diagram that illustrates, in front top, fragmentary perspective view, an embodiment of an example swath or chop header.

FIG. 2A is a schematic diagram that illustrates, in front top, fragmentary perspective view, an embodiment of an example swath or chop header 12. It should be appreciated by one having ordinary skill in the art that the example swath or chop header 12 is merely illustrative, and that other components may be included (e.g., reels, actuators, etc.) but are omitted from FIG. 2A for purposes of brevity. The swath or chop header 12 comprises a frame 20 that, in one embodiment, is open-ended on at least a top side, exposing crop conveying mechanisms to an operator sitting above in a cab of the combine harvester 10. At a front-most end of the swath or chop header 12 is a cutter bar 22 that is affixed to, and moves with, the frame 20. For instance, as the swath or chop header 12 moves up and down and/or tilts, the cutter bar 22 moves correspondingly with the movement of the swath or chop header 12. The cutter bar 22 spans approximately the width of the frame 20. Accordingly, the cutter bar 22 may be adjusted in height to enable the cutting of tall crops, short crops, or crops that are laying on the ground (e.g., laid crops). The cutter bar 22 comprises a plurality of knives (e.g., a first set of knives) that, in one embodiment, oscillate laterally, such as in scissor-like fashion (e.g., against one blade against fixed blade(s) or both blades oscillate) to cut crops, or in some embodiments, as is known in the art. Note that the terms oscillate or the like and scissor-like are used interchangeably throughout the description. In some embodiments, the plurality of knives of the cutter bar 22 may be embodied as rotating knives, such as sets of knives that are affixed to respective rotating disks. The swath or chop header 12 further comprises a conveyor 24 located adjacent to, and rearward of, the cutter bar 22. The conveyor 24 is coupled to the frame 20, and rotates (e.g., around rollers) in known manner to draw the cut crop toward the center of the swath or chop header 12. In some embodiments, plural conveyors 24 may be used, and in some embodiments, the conveyor 24 may be omitted. The swath or chop header 12 further comprises a conveying mechanism embodied as an auger 26. The auger 26 is coupled to the frame 20, and comprises opposing flighting 28 and 30 that causes cut crop to be brought toward the center and rear of the swath or chop header 12. The swath or chop header 12 comprises an opening in the center and rear of the frame 20 that facilitates the conveyance of the cut crop from the swath or chop header 12 to an opening of the feeder house of the combine harvester 10 (FIG. 1). In some embodiments, plural augers may be used in place of the single auger 26 shown in FIG. 2A.

Figure 2B:
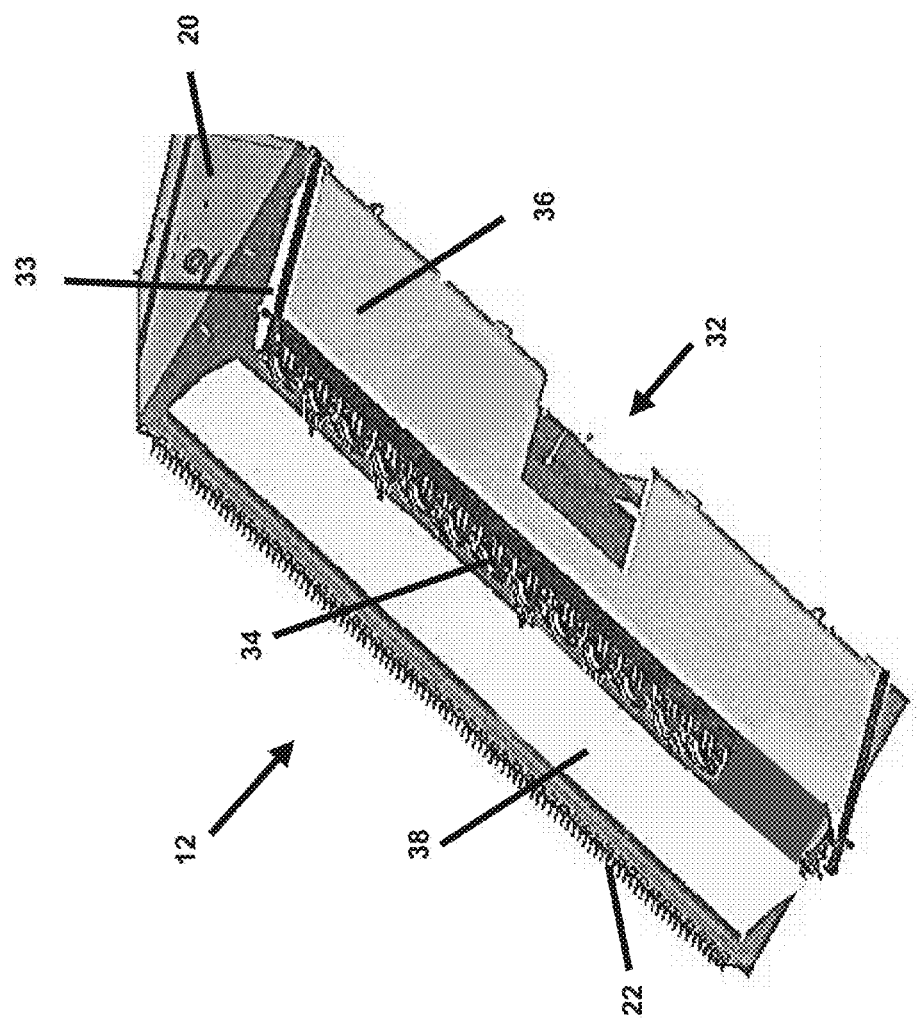
FIG. 2B is a schematic diagram that illustrates, in front bottom, fragmentary perspective view, an embodiment of an example swath or chop header.

FIG. 2B is a schematic diagram that illustrates, in front bottom, fragmentary perspective view, the swath or chop header 12 depicted in FIG. 2A. The swath or chop header 12 comprises the frame 20, including the cutter bar 22 as described above in association with FIG. 2A, and an opening 32 in the rear and bottom-center of the swath or chop header 12 that aligns in one embodiment to the centralized, rearward opening that aligns with the feeder house and in some embodiments is contiguous with the rearward opening. The rearward, bottom opening 32 enables MOG to be deposited under the feeder house. In some embodiments, conventional feeder houses may need to be raised to accommodate the MOG that is deposited beneath it. In some embodiments, the rearward opening connected to the combine feeder house is raised to allow more room for the swathed crop under the feeder house, and thus a raised position of the feeder house when in working position compared to current headers. In some embodiments, the opening 32 may be positioned elsewhere (e.g., higher, in a different lateral position, etc.), or in some embodiments, plural openings may be used (e.g., on or towards opposing lateral ends of the bottom of the frame 20 substantially symmetrical with a longitudinal axis of the machine 10). In the latter embodiment, where the openings 32 are proximal to the frame extremities of the swath or chop header 12, an operator may more easily observe windrow formations from the cab. The swath or chop header 12 further comprises a sub-frame 33 that is pivotably coupled proximal to the rear of the frame 20, and to which is coupled a mower cutter bar 34. Controlled pivotal movement of the sub-frame 33 may be achieved through one or more hydraulic cylinders coupled between the frame 20 and the sub-frame 33. A mower cutter bar 34 is coupled at the forward end of the sub-frame 33 and is adjusted in height according to the pivotable movement of the sub-frame 33, though in some embodiments, may be fixed in position (e.g., coupled to the sub-frame 33 via a hinge point that maintains the position and orientation of the mower cutter bar 34 irrespective of the movement of the sub-frame 33, or in some embodiments, the sub-frame 33 may be fixably coupled to the frame 20 and non-adjustable in height, with the mower cutter bar 34 fixably coupled to the sub-frame 33). In short and tall crops, the mower cutter bar 34 is configured to cut a second portion (e.g., the plant portions not cut by the cutter bar 22) of the crops. In laid crops, the cutter bar 22 performs all or substantially all of the cutting, with the mower cutter bar 34 in some embodiments raised slightly (e.g., with the sub-frame 33). For tall crop cutting implementations, the mower cutter bar 34 lies beneath (e.g., at a lower elevation than) the cutter bar 22. In one embodiment, the mower cutter bar 34 comprises plural knives (e.g., a second set of knives) that are depicted in FIG. 2B as rotary disks, each rotary disk comprising plural knives affixed thereto (herein also referred to as rotary knives). In some embodiments, oscillating or scissor-action knives may be used in place of, or in conjunction with, the rotary knives. Located rearward of the mower cutter bar 34 and pivotably coupled to the sub-frame 33 is a swather 36. The swather 36 collects the MOG from the mower cutter bar 34 and conveys the MOG to the opening 32 to deposit a single swath (or plural openings in some embodiments to deposit plural (e.g., two (2)) swaths). Controlled pivoting motion of the swather 36 may be achieved by one or more hydraulic cylinders coupled between the swather 36 and the frame 20. The swather 36, in some adjusted configurations (e.g., when windrowing straw), may be arranged entirely in-plane or substantially in-plane with the mower cutter bar 34. The swather 36 may be raised to enable the crop to be deposited on the ground. Although the depicted view of FIG. 2B is a bottom side perspective, as described further below, the swather 36 comprises one or more conveyors (e.g., conveying auger with opposing flighting, one or more draper belt conveyors, etc.) on the top side. The swather 36 is pivotably coupled to the sub-frame 33, and when lowered, receives the cut crop material (e.g., cut from the mower cutter bar 34) and conveys the cut crop material toward the opening 32, depositing a swath (or plural swaths in plural openings in some embodiments) on the field. In one embodiment, the swath or chop header 12 comprises a deflector 38. A raised swather 36 exposes a space or opening to permit the deposit of any chopped crop material that passes over the mower cutter bar 34 onto the field and prevent swathing operations as described below. The deflector 38 is pivotably coupled to the frame 20, and is retractably disposed between the cutter bar 22 and the mower cutter bar 34. In some embodiments, the deflector 38 may be omitted, or in some embodiments, plural deflectors may be used. When the deflector 38 is positioned to extend from the frame 20 (e.g., at a hinge point proximal to the cutter bar 22) to a position proximal to the mower cutter bar 34, the deflector 38 serves to prohibit or at least significantly inhibit movement of the cut crop past the mower cutter bar 34. In other words, a recirculation of the cut crop is achieved in front of the mower cutter bar 34, enabling a chopping action to be implemented by the mower cutter bar 34. The deflector 38 may be controllably positioned (e.g., by one or more hydraulic cylinders coupled between the deflector 38 and the frame 20) to enable the conversion of the mower cutter bar 34 from a cutting unit to a chopping unit and vice versa.

Figure 3A:
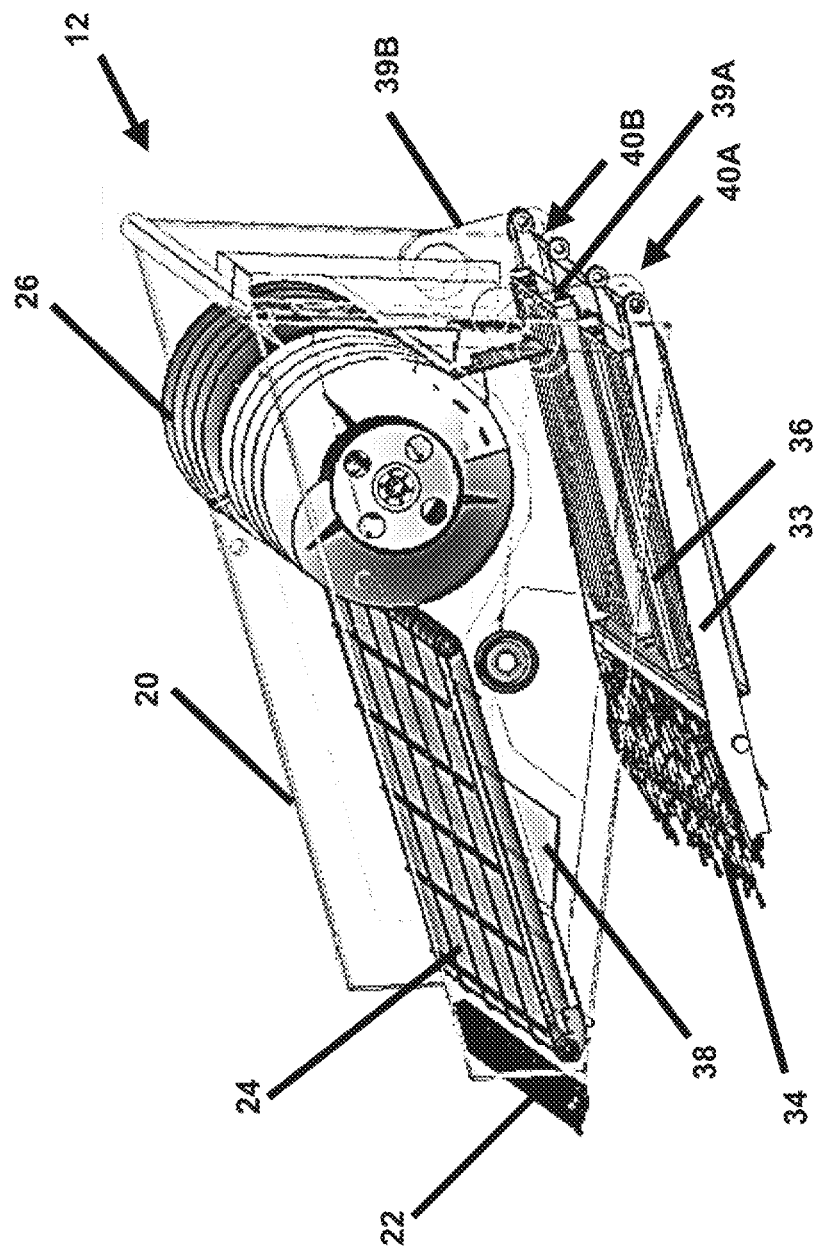
FIGS. 3A-3B are schematic diagrams that illustrate, in fragmentary side perspective views, an embodiment of an example swath or chop header used in cutting and swathing operations.
Figure 3B:
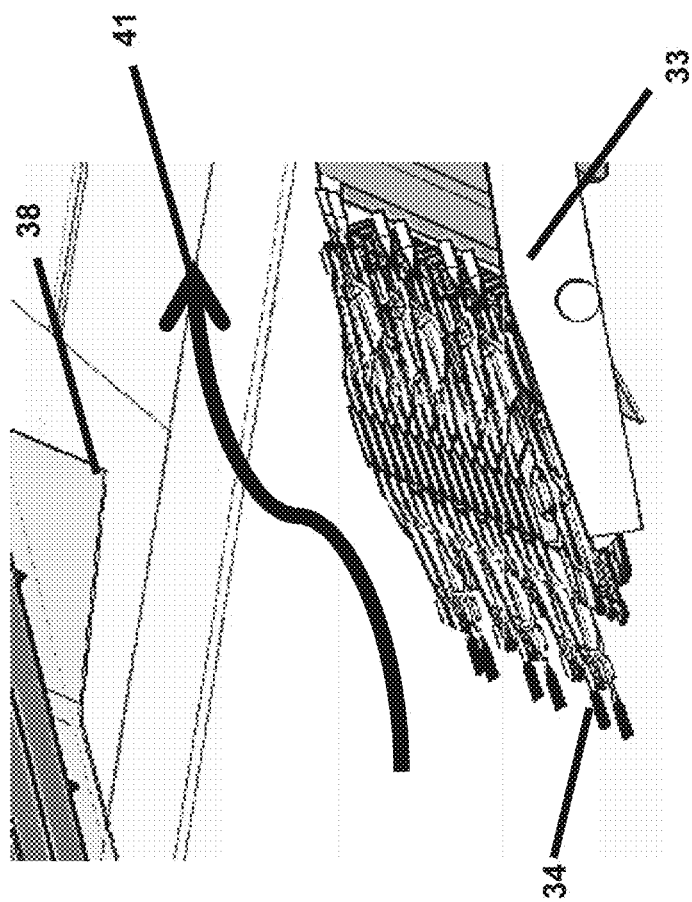

FIGS. 3A-3B are schematic diagrams that illustrate, in fragmentary side perspective views, an embodiment of an example swath or chop header 12 used in cutting and swathing operations. Certain well-known controls, such as actuators, hydraulic cylinders, and other components (e.g., known structures of the frame 20 or coupled thereto) are omitted from the views or illustrated by transparent lines to facilitate an understanding of pertinent features of the swath or chop header 12. As described above, the swath or chop header 12 comprises the frame 20, to which is coupled the cutter bar 22, the conveyor 24, the auger 26, and the sub-frame 33. The sub-frame 33 is pivotably coupled to the frame 20 in one embodiment via hinges 39A and 39B. Fixably coupled to the sub-frame 33 is the mower cutter bar 34, though in some embodiments, the mower cutter bar 34 may be pivotably coupled to the sub-frame 33. Also, in one embodiment, the swather 36 is pivotably coupled to the sub-frame at pivot or hinge points 40A and 40B. Also shown is the deflector 38. In the configuration shown in FIGS. 3A-3B, the deflector 38 is in an up or raised position, and the swather 36 is in a down or lowered position. The cutter bar height may be adjusted to cut the head portions (and some (insubstantial) portions beneath the head portions) of the plants of the crop depending on the crop height, after which the cut crop is passed through the combine harvester 10 (FIG. 1). The lower mower cutter bar 34 is positioned to cut the remaining portion to enable the cut crop to pass to the swather 36 for enabling the deposit of swath on the ground (without passing through the combine harvester 10). That is, the MOG (e.g., straw) cut by the knives of the rotary disks of the mower cutter bar 34 passes onto the swather 36, as represented by arrow 41 in FIG. 3B, enabling the MOG to be conveyed to the opening(s) 32 (FIG. 2B) and onto the field as a swath(s).

Figure 4A:
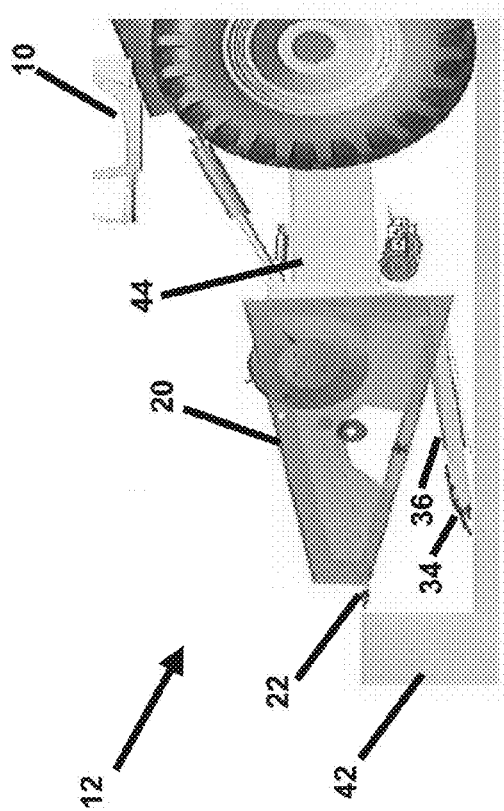
FIG. 4A is a schematic diagram that illustrates, in fragmentary side elevation view, an embodiment of an example swath or chop header used to cut and swath tall crops.

Referring to FIG. 4A, shown is a schematic diagram that further illustrates, in fragmentary side elevation view, an embodiment of an example swath or chop header 12 used to cut and swath tall crops 42. In the depicted configuration of the swath or chop header 12, the swath or chop header 12 is raised (and/or tilted) to enable the cutter bar 22 to cut one portion (e.g., the heads) of tall crops 42 (e.g., tall wheat, etc.), which is subsequently passed through a rearward, central opening of the swath or chop header 12 and into a feeder house 44 of the combine harvester 10 for processing in known manner. The mower cutter bar 34 is positioned close to the ground to cut another portion (e.g., MOG) of the crops 42. The swather 36 is positioned substantially in-plane and rearward of the mower cutter bar 34 (e.g., bottomed against the mower cutter bar 34) to enable swathing of the cut crop that passes over the mower cutter bar 34. The deflector (not shown) is retracted against the frame 20 (e.g., adjacent the cutter bar 22).

Figure 4B:
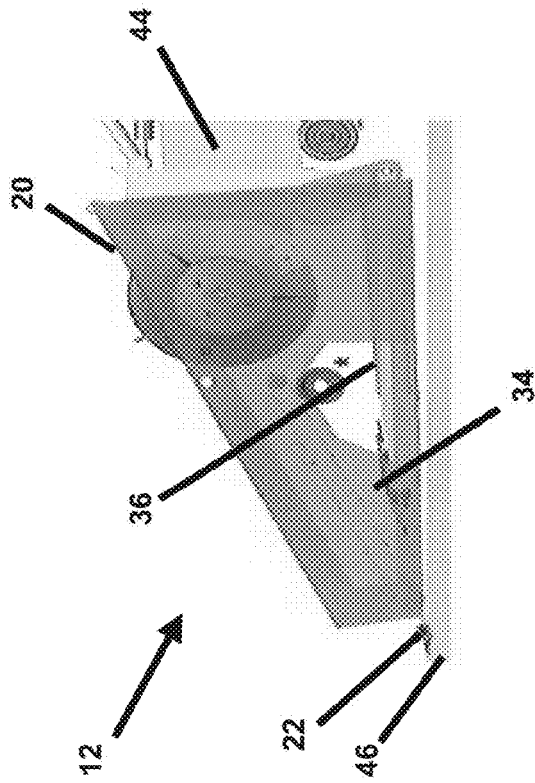
FIG. 4B is a schematic diagram that illustrates, in fragmentary side elevation view, an embodiment of an example swath or chop header used to cut and swath short crops.

Referring to FIG. 4B, shown is a schematic diagram that illustrates, in fragmentary side elevation view, an embodiment of an example swath or chop header 12 used to cut and swath short crops. In the depicted configuration of the swath or chop header 12, the swath or chop header 12 is lowered (and/or tilted) to a position close to the ground to enable the cutter bar 22 to cut the heads of the short crops 46, which are subsequently passed through the swath or chop header 12 and into the combine harvester 10 (FIG. 4A) in known manner. The mower cutter bar 34 is positioned close to the ground, cutting another portion (MOG) of the crops. The cut crops are passed to the swather 36, which is positioned close to the ground and rearward of the mower cutter bar 34 (e.g., bottomed against the mower cutter bar 34 to be substantially in-plane with the mower cutter bar 34) to enable swathing of the cut crop that passes over the mower cutter bar 34. The deflector (not shown) is retracted against the frame 20 (e.g., adjacent the cutter bar 22). Such a configuration is favorable for low crops or soybean, for instance. In effect, the space between the swather 36 and the frame 20 is increased when crop height is increased, as suggested by the configurations in FIGS. 4A-4B. In some embodiments, the mower cutter bar 34 may be raised slightly, such as in laid crops, to enable the cutter bar 22 to solely perform the cutting. The cut crops are passed to the swather 36, which swaths the cut crops onto the field. In some embodiments, when the mower cutter bar 24 is physically above the cutter bar 22 (e.g., relative to ground), the mower cutter bar 34 does not cut any crop. In some embodiments, if the mower cutter bar 34 is positioned below the cutter bar 22 (relative to ground), the mower cutter bar 34 may cut crops.

Figure 5B:
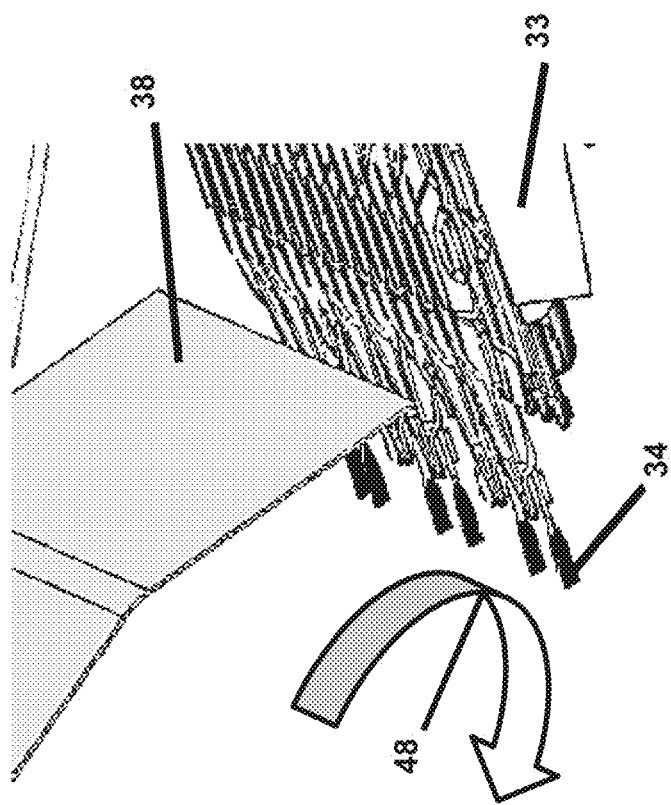

FIGS. 5A-5B are schematic diagrams that illustrate, in fragmentary side perspective views, an embodiment of an example swath or chop header 12 that is used in cutting and chopping operations. Certain well-known controls, such as actuators, and other components (e.g., known structures of the frame 20) are omitted from the views to facilitate an understanding of pertinent features of the swath or chop header 12. The swath or chop header 12 comprises the frame 20 to which is coupled the cutter bar 22, the conveyor 24, the auger 26, the deflector 38, and the sub-frame 33, as described similarly in association with FIGS. 3A-3B. Coupled to the sub-frame 33 are the mower cutter bar 34 and the swather 36. In the configuration shown in FIGS. 5A-5B, assuming a scenario of harvesting tall crops, the deflector 38 is in a down or lowered position, and the swather 36 is in an up or raised position (e.g., out-of-plane with respect to the mower cutter bar 34). For instance, the deflector 38 may be pivotably coupled to the frame 20 at a location proximal to the cutter bar 22. The swather 36 and the mower cutter bar 34 may each be coupled to the sub-frame 33, which is pivotably coupled to the frame 20 via hinges 39A, 39B. In one embodiment, the mower cutter bar 34 is moveable with the sub-frame 33, whereas the swather 36 is pivotably coupled to the sub-frame 33 at pivot or hinge points 40A, 40B as described previously. The MOG (e.g., straw) cut by the knives of the rotary disks of the mower cutter bar 34 is recirculated (as represented by the recirculating arrow in FIG. 5B) in front of the deflector 38 due to the deflector 38 prohibiting or inhibiting rearward flow of the cut crop over the mower cutter bar 34, which causes chopping of the cut crop (MOG) by the mower cutter bar 34. Further, since the swather 36 is in the raised position, cut crop is prohibited from passing onto the swather 36, instead falling to the ground.

Figure 6A:
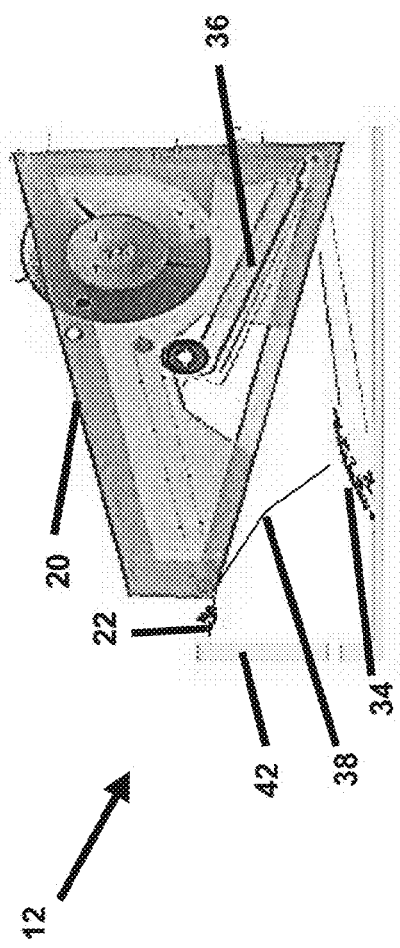
FIG. 6A is a schematic diagram that illustrates, in fragmentary side elevation view, an embodiment of an example swath or chop header used to cut and chop tall crops.

Referring now to FIG. 6A, shown in fragmentary side elevation view is an embodiment of an example swath or chop header 12 used to cut and chop tall crops. In the depicted configuration of the swath or chop header 12, the swath or chop header 12 is raised (and/or tilted) to enable the cutter bar 22 to cut one portion (e.g., the heads) of the tall crops 42 (e.g., tall plants such as wheat), the cut crop portion passed through the swath or chop header 12 and to the combine harvester 10 (FIG. 1) in known manner. The mower cutter bar 34 is positioned close to the ground to cut another portion (e.g., MOG) of the crops 42. The swather 36 is pivoted out-of-plane relative to, and rearward to, the mower cutter bar 34. In the depicted embodiment, the swather 36 is raised against the frame 20. The deflector 38 is lowered to extend proximal to the mower cutter bar 34 (e.g., against the mower cutter bar 34) to prevent or hinder rearward cut crop flow over the mower cutter bar 34 and enable recirculation of the cut crop to facilitate chopping. The chopped crop material is deposited on the ground and prevented from being swathed by virtue of the raised swather 36.

Figure 6B:
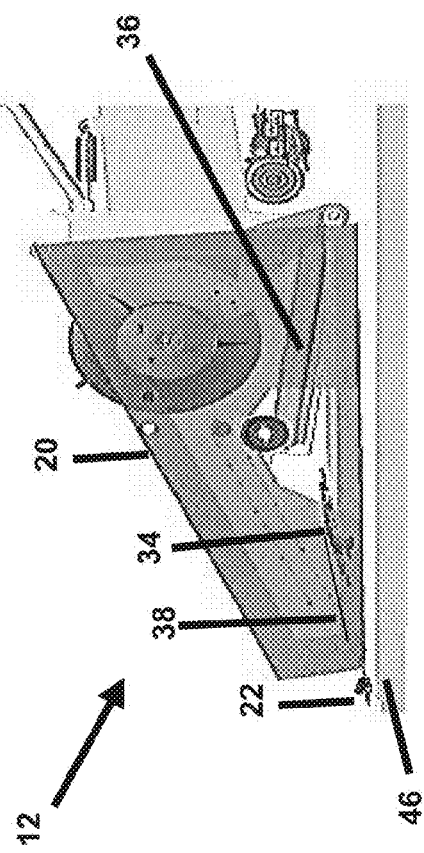
FIG. 6B is a schematic diagram that illustrates, in fragmentary side elevation view, an embodiment of an example swath or chop header used to cut and chop short crops.

Referring to FIG. 6B, shown is a schematic diagram that illustrates, in fragmentary side elevation view, an embodiment of an example swath or chop header 12 used to cut and chop short crops. In the depicted configuration of the swath or chop header 12, the swath or chop header 12 is lowered (or tilted) to a position close to the ground to enable the cutter bar 22 to cut the short crops 46, which is subsequently passed through the swath or chop header 12 and into the combine harvester 10 (FIG. 1) in known manner. The mower cutter bar 34 is likewise positioned close to the ground to cut another portion (e.g., MOG) of the crops 46. The swather 36 is positioned out-of-plane relative to, and rearward to, the mower cutter bar 34 (e.g., raised against the frame 20) and the deflector 38 is lowered to extend proximal to the mower cutter bar 34 (e.g., against or adjacent the mower cutter bar 34) to enable recirculation of the cut crop and prevent or hinder the rearward flow of the cut crop over the mower cutter bar 34 and further to enable chopping by the mower cutter bar 34 of the recirculated crop. Such a configuration is favorable for low crops or soybean, for instance. As described previously, in some implementations (e.g., involving laid crop), the mower cutter bar 34 may be raised and the cutter bar 22 is solely responsible for cutting and/or chopping the laid crop.

Note that mechanisms (e.g., actuators and hydraulic cylinders) for raising and lowering the swath or chop header 12, and hence the raising or lowering of the cutter bar 22, are well-known to those having ordinary skill in the art, and hence discussion of the same is omitted here for brevity. Similarly, the adjustment of the sub-frame 33, the swather 36, and the deflector 38 may be achieved according to mechanisms well-known in the art. For instance, and referring again to FIG. 5A, hydraulic cylinders 50A and 50B (shown schematically) may be coupled between the frame 20 and the swather 36 to enable the swather 36 to be raised and lowered independent of the sub-frame 33. For instance, in one embodiment, the hydraulic cylinders 50 (e.g., 50A and 50B) may be part of a hydraulic cylinder circuit (hereinafter, cylinder circuit) comprising a valve (e.g., hydraulic, though other mechanisms such as electric, electro-magnetic, or pneumatic, or some combination thereof may be used) coupled to a valve actuator (e.g., solenoid) that receives a signal from a controller (e.g., based on user intervention and/or sensor input, such as sensed crop height) and causes actuation of the valve. The actuation of the valve may alter the flow through the hydraulic cylinders 50 (e.g., single acting), causing an extending or retraction of a rod of the hydraulic cylinder coupled to the swather 36, which in turn causes a raising or lowering action of the swather 36. A similar mechanism may be used independently for the adjustment of the sub-frame 33 (via a cylinder circuit comprising plural hydraulic cylinders 52 (one shown) coupled between the frame 20 and sub-frame 33) and the deflector 38 (via a cylinder circuit comprising plural hydraulic cylinders 54 (one shown) coupled between the frame 20 and deflector 38. In some embodiments, return to quiescent position of the sub-frame 33, the swather 36, and/or deflector 38 may be achieved via a known biasing mechanism, such as a spring. Further description is provided below in association with FIGS. 8A-8B.

Figure 7A:
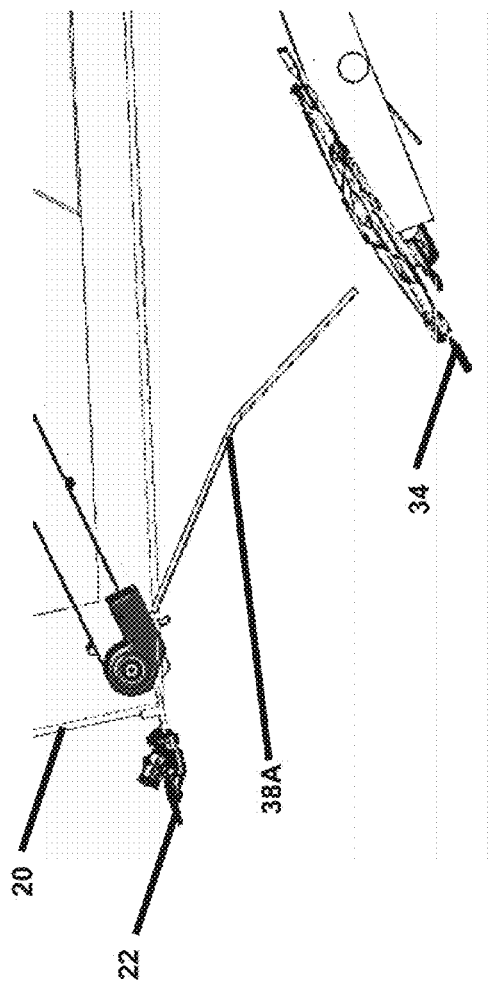
FIG. 7A is a schematic diagram that illustrates, in fragmentary side elevation view, an embodiment of an example deflector.

FIG. 7A is a schematic diagram that illustrates, in fragmentary side elevation view, an embodiment of an example deflector 38A. As depicted, the deflector 38A, when positioned in an extended or activated (e.g., operational) position, extends to a location from the frame 20 proximal to the cutter bar 22 to approximately a top surface of the mower cutter bar 34. Though shown with a slight bend approximately midway along the length of the deflector 38A, it should be appreciated that other geometrical configurations may be used and hence are contemplated to be within the scope of the disclosure.

Figure 7B:
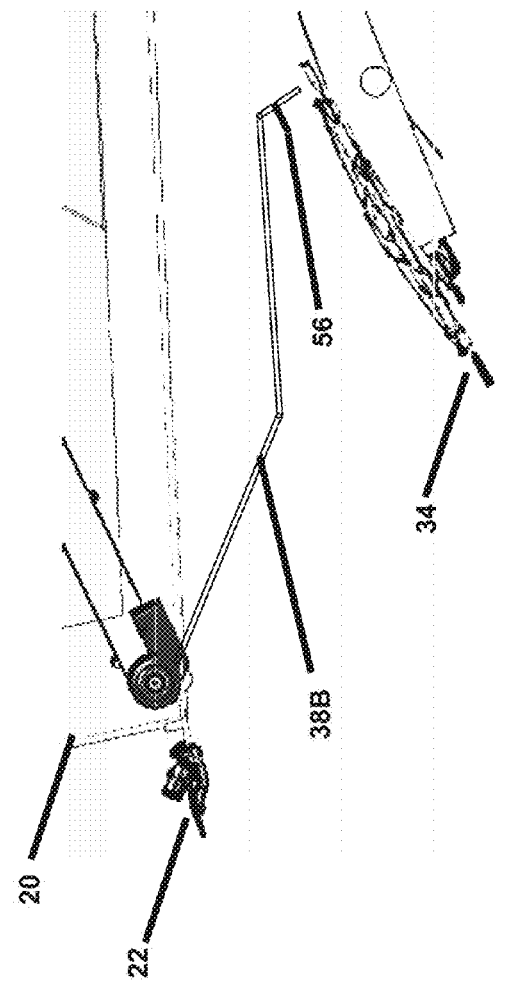
FIG. 7B is a schematic diagram that illustrates, in fragmentary side elevation view, another embodiment of an example deflector.

FIG. 7B is a schematic diagram that illustrates, in fragmentary side elevation view, another embodiment of an example deflector, denoted as deflector 38B. In this example embodiment, the deflector 38B extends from a similar location as the deflector 38A (FIG. 7A), yet extends to a location rearward of and adjacent the mower cutter bar 34, with at least one set of stationary knives 56 extending across the width of the deflector 38B. For instance, the deflector 38B may comprise a half-cup configuration that encloses the knives (e.g., disk with knives), which along with the addition of the stationary knives 56, provides an improved chopping action. In some embodiments, one or more of these features may be omitted, or additional knives and/or a different geometrical configuration for the deflector 38B may be used.

Figure 8A:
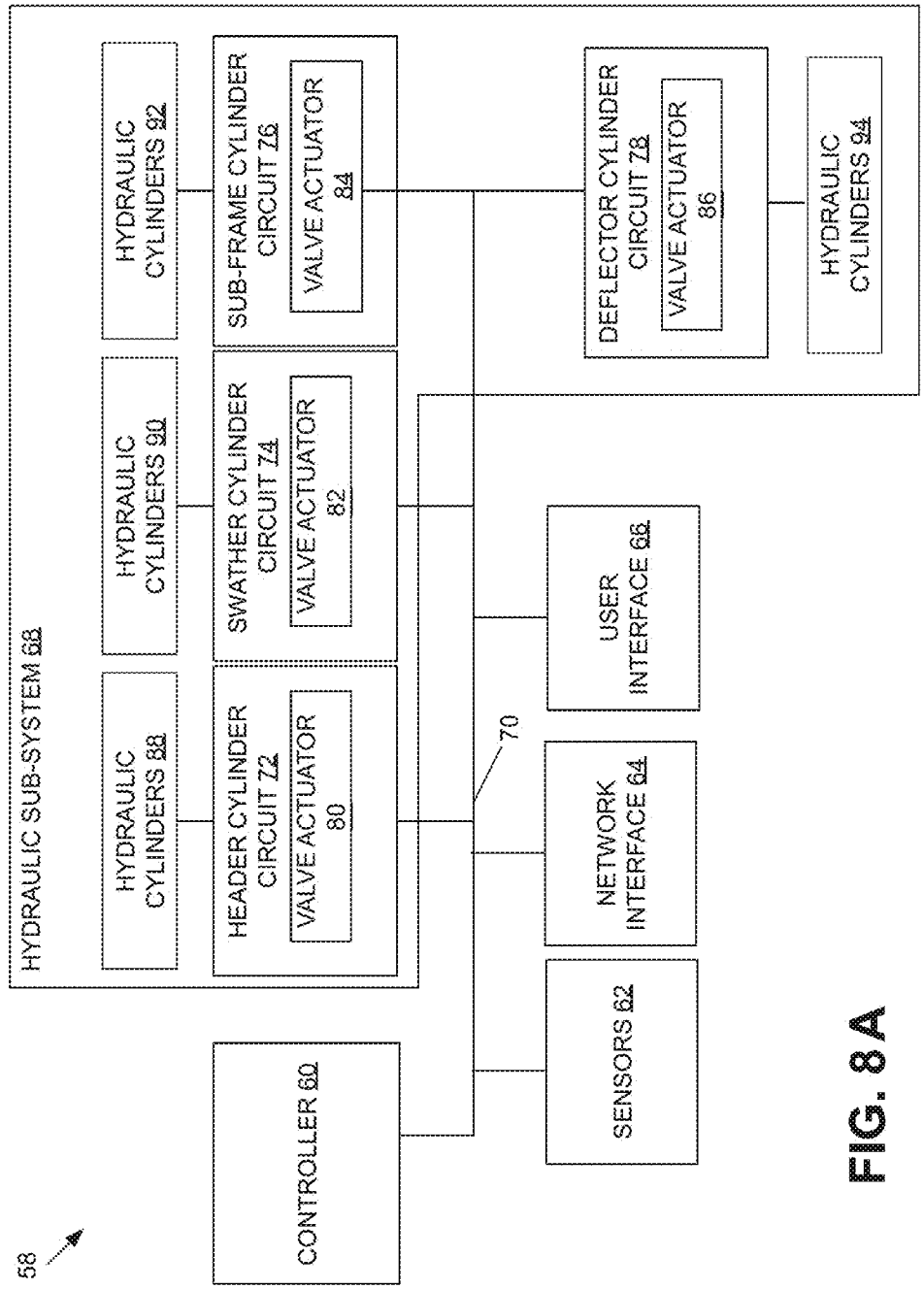
FIG. 8A is a block diagram of an embodiment of an example control system for operating an embodiment of an example swath or chop header.

Referring now to FIG. 8A, shown is a block diagram of an embodiment of an example control system 58 for operating an embodiment of an example swath or chop header 12 (FIG. 2A). It should be appreciated within the context of the present disclosure that some embodiments may include additional components or fewer or different components, and that the example depicted in FIG. 8A is merely illustrative of one embodiment among others. The control system 58 comprises one or more controllers 60 (e.g., electronic control unit or ECU, where one (1) ECU is depicted in FIG. 8A for illustration), one or more optional sensors 62, a network interface 64, a user interface 66, and a hydraulic sub-system 68, all coupled via one or more networks, such as network 70 (e.g., a CAN network or other network, such as a network in conformance to the ISO 11783 and 11898 standards, also referred to in part as "Isobus"). Note that, although emphasis is placed on hydraulic systems for control, other mechanisms such as electrical servos, electromagnetic, or pneumatic forms of control may be used in some embodiments.

The hydraulic sub-system 68 comprises controls for adjusting the movement (e.g., height) of the cutter bar 22 (e.g., adjusting the height and/or tilt of the swath or chop header 12, FIG. 3A), and adjusting the movement of the sub-frame 33 (FIG. 3A), the swather 36 (FIG. 3A), and the deflector 38 (FIG. 3A). For instance, in one embodiment, the hydraulic sub-system 68 comprises a header cylinder circuit 72, a swather cylinder circuit 74, a sub-frame cylinder circuit 76, and a deflector cylinder circuit 78. Each cylinder circuit 72-78 comprises at least one valve (e.g., hydraulic valve) with a coupled valve actuator (e.g., solenoid, etc.), including a valve actuator 80 (for header cylinder circuit 72, and in some embodiments, two valve actuators and two cylinder circuits, one for raising and lower and one for tilt functionality), a valve actuator 82 (for swather cylinder circuit 74), a valve actuator 84 (for sub-frame cylinder circuit 76), and a valve actuator 86 (for deflector cylinder circuit 78). Each cylinder circuit 72-78 is respectively coupled to one or more hydraulic cylinders (plural (e.g., two) for each hydraulic control circuit 72-78 is depicted in FIG. 8A for illustration), such as hydraulic cylinders 88 (for header cylinder circuit 72), hydraulic cylinders 90 (for swather cylinder circuit 74), hydraulic cylinders 92 (for sub-frame cylinder circuit 76), and hydraulic cylinders 94 (for deflector cylinder circuit 78).

In one example operation, the controller 60 signals (over the network 70, which may comprise multiple wires in a wiring harness, such as in twisted pair configuration, logically embodied as a bus or busses) the respective valve actuators 80-86 to cause a coupled poppet or spool of the respective valve to change position, which in turn causes a change in flow direction and/or rate through the associated hydraulic cylinders 88-94. The change in flow and/or rate results in actuation of the respective coupled hydraulic cylinders 88-94. As is known, and digressing briefly, each hydraulic cylinder of hydraulic cylinders 88-94 comprises a rod and piston assembly that move due to an applied force (e.g., which is a function of the pressure and area differentials on both sides of the piston) on the piston and the amount of the flow that is directed to the hydraulic cylinder. For instance, due to differences in the area on the sides of the piston, the hydraulic fluid flow directed to the head end generates a higher speed of the piston than the same amount of hydraulic fluid directed to the cap end of the piston. For the same pressure of the hydraulic fluid, higher force is generated on the cap end than on the head end due to a larger area of the piston on the cap end. Thus, the speed of the piston depends on the flow rate and the effective area of the piston. The force generated by the piston depends on both the pressure difference on both sides of the piston and the difference in effective area on each side of the piston. The hydraulic fluid flow to and out of the hydraulic cylinder is controlled by the respective valve (e.g., of the cylinder circuits 72-78). The pressure in the cylinder chamber(s) is dependent on one or more parameters such as external load applied to the rod, inertia loads of the piston/rod assembly, the amount of flow directed by the valve, among other factors. In general, the rod and piston assembly move (e.g., extending the rod past the head end of the cylinder barrel of the hydraulic cylinder, or retracting the rod to further within the cylinder barrel of the hydraulic cylinder). The rods of the hydraulic cylinders may couple to one structure, such as in the case of the header cylinder circuit 72, the feeder house 44 (FIG. 4A), and the cap end may coupled to another structure, such as in the case of the hydraulic cylinders 88, to the chassis of the combine harvester 10. Example coupling points are evident from FIG. 5A and the associated discussion pertaining to hydraulic cylinders 50, 52, and 54, and hence discussion of the same is omitted here for brevity.

The control system 58 further comprises the user interface 66, the one or more sensors 62, and the network interface 64. The user interface 66 may include one or more of a keyboard, mouse, microphone, touch-type display device, joystick, steering wheel, FNR lever, or other devices (e.g., switches, immersive head set, etc.) that enable input and/or output by an operator (e.g., to respond to indications presented on the screen or aurally presented, or in some embodiments, to enable input by the operator based on observation of the field conditions) and/or enable monitoring of machine operations. In some embodiments, an operator may cause adjustment of the height and/or tilt of the swath or chop header 12 (FIG. 3A), and/or the position of the sub-frame 33, the swather 36, and/or the deflector 38 via the user interface 66, based for instance on observed crop conditions (e.g., height) from the cab or via cameras, or via feedback presented via the user interface 66. In some embodiments, feedback of the adjustments may be indicated on an operator screen or otherwise indicated to an operator (whether situated remotely or located in the cab of the combine harvester 10, FIG. 1), such as to alert an operator of the impending and/or completed action and/or to solicit operator intervention before the action is taken.

The network interface 64 comprises hardware and/or software (e.g., radio and/or cellular modem) that enable wireless connection to one or more remotely located computing devices over a network (e.g., wireless or mixed wireless and wired networks). For instance, the network interface 64 may cooperate with browser software and/or other software of a controller to communicate with a server device over cellular links, among other telephony communication mechanisms and radio frequency communications, enabling remote monitoring or control of the combine harvester 10 (FIG. 1) and/or its associated functions. The network interface 64 may comprise MAC and PHY components (e.g., radio circuitry, including transceivers, antennas, etc.), as should be appreciated by one having ordinary skill in the art.

The sensors 62 may comprise, for instance, a height sensor (e.g., using well-known contact or non-contact technology, such as optical mechanisms) that detects the height of the crop and provides the controller 60 with information that causes the controller 60 to adjust (e.g., automatically, or with operator intervention) the movement of the swath or chop header 12 (FIG. 3A) and/or the other components (e.g., the sub-frame 33, the swather 36, the deflector 38, etc.). In some embodiments, the information from the sensors 62 may be presented to the operator to enable the operator to effect the necessary adjustments to the swath or chop header 12 and/or components therein. Note that in some embodiments, a more rudimentary control mechanism may be used.

Note that the communication medium for the control system 58 may comprise multiple independent (e.g., twisted pair) wiring of a wiring harness according to a logical CAN bus configuration (e.g., CAN ISO 11898, ISO 11783, etc.), wherein the connected components are nodes (e.g., addressable, such as via J1939 or other mechanisms) along the bus. It should be appreciated by one having ordinary skill in the art that other forms of communication may be used in some embodiments, such as an arrangement complying with RS232, wireless communications and protocols (near field, Bluetooth, etc.), among others well known to those having ordinary skill in the art.

Figure 8B:
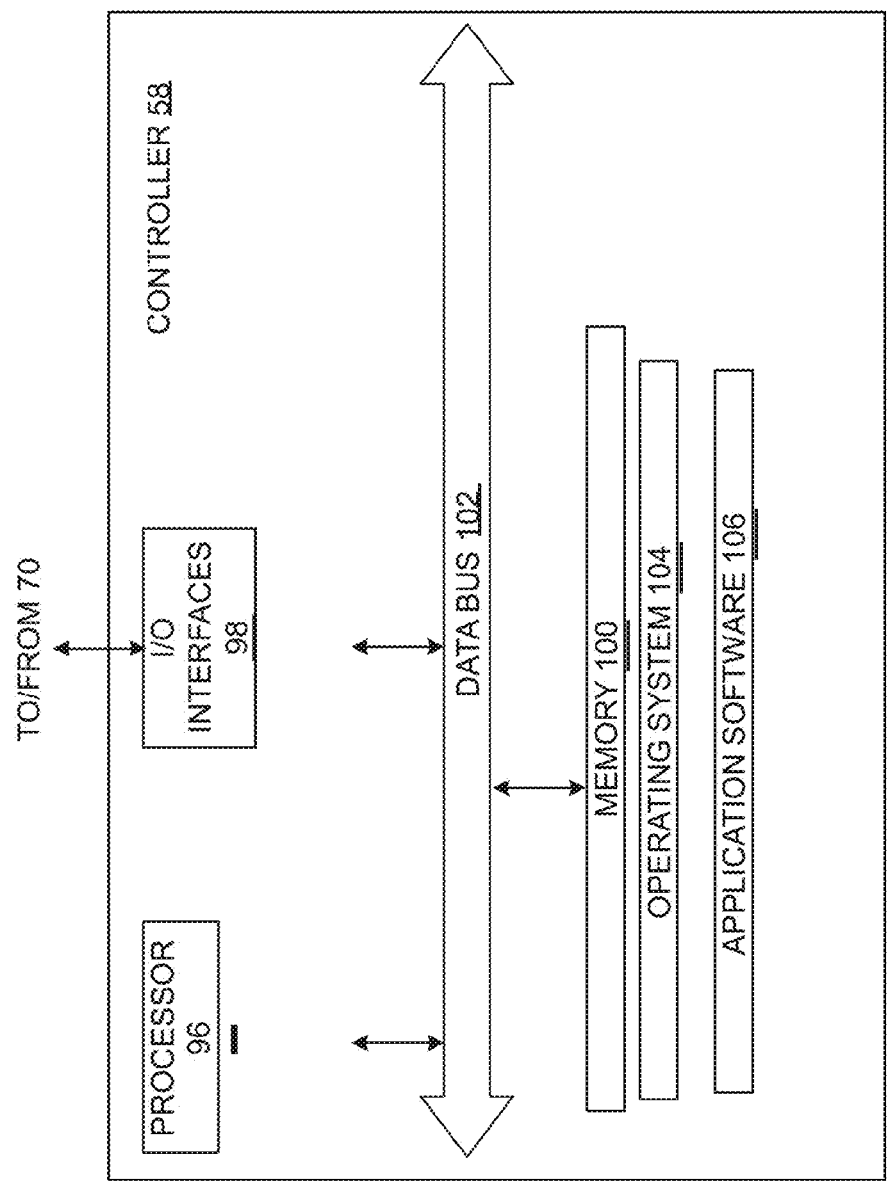
FIG. 8B is a block diagram of an embodiment of an example controller used in the example control system of FIG. 8A.

FIG. 8B further illustrates an example embodiment of the controller 58 shown in FIG. 8A. One having ordinary skill in the art should appreciate in the context of the present disclosure that the example controller 58 is merely illustrative, and that some embodiments of controllers may comprise fewer or additional components, and/or some of the functionality associated with the various components depicted in FIG. 8B may be combined, or further distributed among additional modules or controllers, in some embodiments. It should be appreciated that, though described in the context of residing in the combine harvester 10 (FIG. 1), in some embodiments, the controller 58, or all or a portion of its corresponding functionality, may be implemented in a computing device or system located external to the combine harvester 10. Referring to FIG. 8B, with continued reference to FIG. 8A, the controller 58 is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 58. In one embodiment, the controller 58 comprises one or more processors, such as processor 96, input/output (I/O) interface(s) 98, and memory 100, all coupled to one or more data busses, such as data bus 102. The memory 100 may include any one or a combination of volatile memory elements (e.g., random-access memory RAM, such as DRAM, and SRAM, etc.) and nonvolatile memory elements (e.g., ROM, hard drive, tape, CDROM, etc.). The memory 100 may store a native operating system, one or more native applications, emulation systems, or emulated applications for any of a variety of operating systems and/or emulated hardware platforms, emulated operating systems, etc. In some embodiments, a separate storage device may be coupled to the data bus 102, such as a persistent memory (e.g., optical, magnetic, and/or semiconductor memory and associated drives).

In the embodiment depicted in FIG. 8B, the memory 100 comprises an operating system 104 and application software 106. It should be appreciated by one having ordinary skill in the art in the context of the present disclosure that the controller 58 may embody other mechanisms of control in some embodiments, such as a more rudimentary form of control where the operating system and application software are omitted. The application software 106 receives sensor and/or user input, and responds with one or more signals (sent wirelessly and/or over a wired medium, such as the network 70) to the hydraulic sub-system 68 to cause a change in hydraulic fluid flow and/or rate through the desired actuable device, such as one or more of hydraulic cylinders 88-94. The application software 106 uses user and/or sensor input to determine and cause the desired configuration (e.g., height, whether activated, etc.) for the swath or chop header 12 (FIG. 1) and/or the components therein. Note that the controller 58 may communicate with an intervening controller associated with one or more of the respective cylinder circuits 72-78.

Execution of the application software 106 may be implemented by the processor 96 under the management and/or control of the operating system 104. In some embodiments, the operating system 104 may be omitted and a more rudimentary manner of control implemented. The processor 96 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 58.

The I/O interfaces 98 provide one or more interfaces to the network 70 and other networks. In other words, the I/O interfaces 98 may comprise any number of interfaces for the input and output of signals (e.g., analog or digital data) for conveyance of information (e.g., data) over the network 70. The input may comprise input by an operator (local or remote) through the user interface 66, and/or input from signals carrying information from one or more of the components of the combine harvester 10 (FIG. 1), such as the sensor(s) 62, an associated controller, and/or the network interface 64, among other devices. Outputs may be provided to the hydraulic sub-system 68 via the network 70.

When certain embodiments of the controller 58 are implemented at least in part with software (including firmware), as depicted in FIG. 8B, it should be noted that the software (e.g., such as the application software 106) can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 58 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), relays, contactors, etc.

Figure 9:
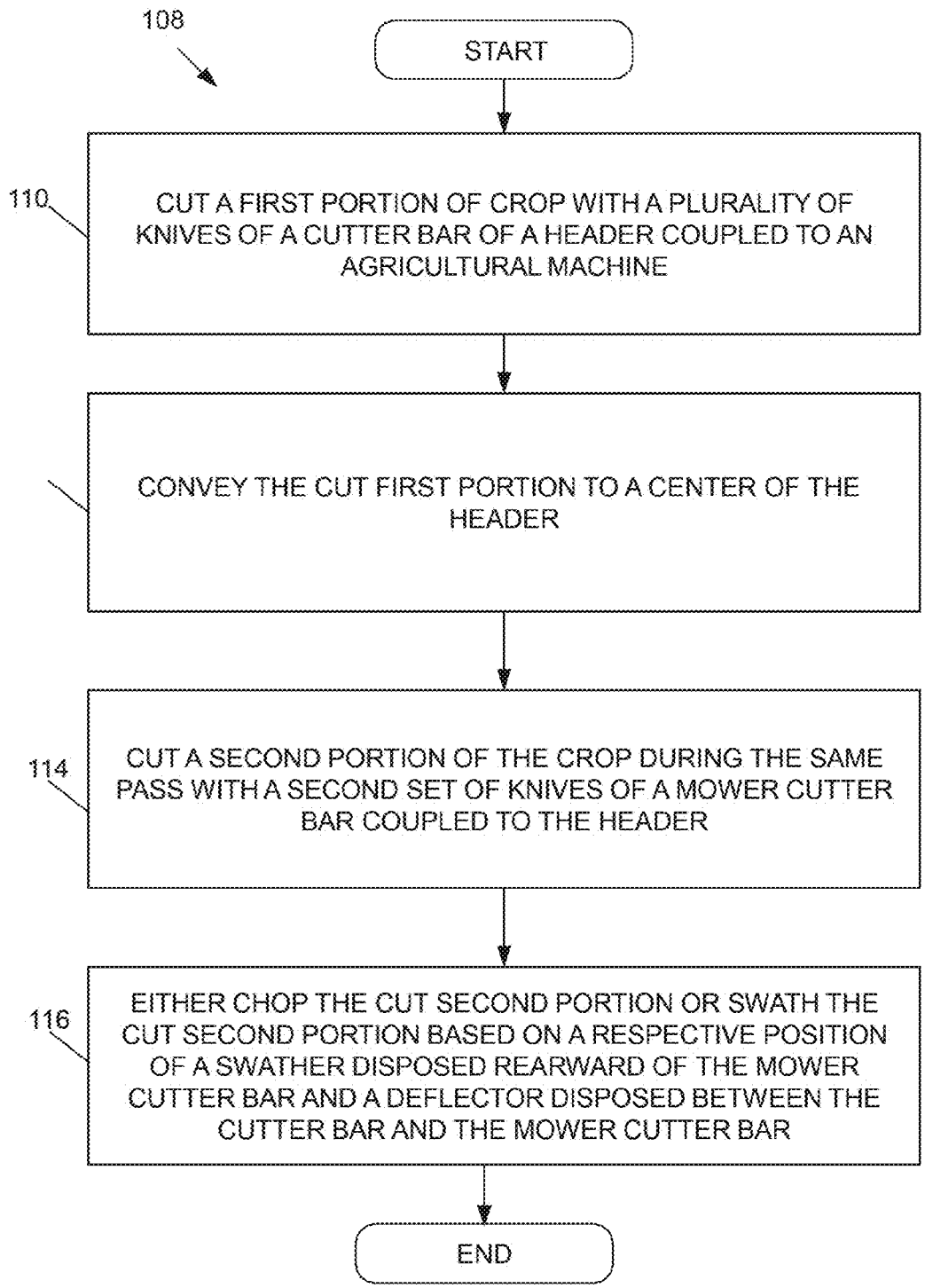
FIG. 9 is a flow diagram that illustrates an embodiment of a method for operating an embodiment of an example swath or chop header.

In view of the above description, it should be appreciated that one embodiment of a method 108, as depicted in FIG. 9, comprises: a method, comprising: in one pass: cutting a first portion of crop with a plurality of knives of a cutter bar of a header coupled to an agricultural machine (110); conveying the cut first portion to a center of the header (112); cutting a second portion of the crop during the same pass with a second set of knives of a mower cutter bar coupled to the header (114); and either chopping the cut second portion or swathing the cut second portion based on a respective position of a swather disposed rearward of the mower cutter bar and a deflector disposed between the cutter bar and the mower cutter bar (116).

Any process descriptions or blocks in flow diagrams should be understood as representing steps in the process, and alternate implementations are included within the scope of the embodiments in which functions may be executed out of order from that shown or discussed, as would be understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

At least the following is claimed:

1. A grain header, comprising:
   a frame;
   a cutter bar affixed to the frame;
   a sub-frame pivotably coupled to the frame with at least one hinge;
   a mower cutter bar coupled to the sub-frame; and
   a swather coupled to the sub-frame and arranged rearward relative to the mower cutter bar, the swather located proximal to the mower cutter bar; and
   a deflector mounted on the frame and disposed between the cutter bar and the mower cutter bar, the deflector being moveable between a raised position in which the deflector permits crop material cut by the mower cutter bar to pass onto the swather, and a lowered position in which the deflector inhibits crop material cut by the mower cutter bar from passing onto the swather.

2. The header of claim 1, wherein the cutter bar comprises a plurality of oscillating or scissor action knives.

3. The header of claim 1, wherein the mower cutter bar comprises a plurality of oscillating knives.

4. The header of claim 1, wherein the mower cutter bar comprises a plurality of rotating disks.

5. The header of claim 1, wherein the swather comprises at least one conveyor that is pivotably coupled to the sub-frame with at least one hinge.

6. The header of claim 1, further comprising one or more augers coupled to the frame and disposed rearward of the cutter bar.

7. The header of claim 6, further comprising one or more conveyors disposed between the cutter bar and the one or more augers.

8. A system, comprising:
   an agricultural machine; and
   a header coupled to the agricultural machine, the header comprising:
      a frame;
      a cutter bar affixed to the frame;
      a sub-frame pivotably coupled to the frame with at least one hinge;
      a mower cutter bar coupled to the sub-frame; and
      a swather coupled to the sub-frame and arranged rearward relative to the mower cutter bar, the swather located proximal to the mower cutter bar; and
      a deflector mounted on the frame and disposed between the cutter bar and the mower cutter bar, the deflector moveable between a raised position in which the deflector permits crop material cut by the mower cutter bar to pass onto the swather, and a lowered position in which the deflector inhibits crop material cut by the mower cutter bar from passing onto the swather.

9. The system of claim 8, wherein the cutter bar comprises a plurality of oscillating or scissor-action knives.

10. The system of claim 8, wherein the mower cutter bar comprises a plurality of oscillating knives.

11. The system of claim 8, wherein the mower cutter bar comprises a plurality of rotating disks.

12. The system of claim 8, wherein the swather comprises one or more conveyors pivotably coupled to the sub-frame with at least one hinge.

13. The system of claim 8, further comprising one or more augers coupled to the frame and disposed rearward of the cutter bar.

14. The system of claim 13, further comprising one or more conveyors disposed between the cutter bar and the one or more augers.

* * * * *